(12) United States Patent
Pollitt et al.

(10) Patent No.: US 8,127,538 B2
(45) Date of Patent: Mar. 6, 2012

(54) LIQUID INJECTOR ASSEMBLY WITH A FLANGED CONNECTOR CONNECTION

(75) Inventors: Dwayne Pollitt, Novi, MI (US); Furqan Zafar Shaikh, Troy, MI (US); Scott Donald Cooper, Ann Arbor, MI (US); Michael Levin, Ann Arbor, MI (US); John Paul Bogema, Flat Rock, MI (US); Bret Alan Zimmerman, Grosse Point Farms, MI (US); Gary Scott Nichols, Jackson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1020 days.

(21) Appl. No.: 12/053,048

(22) Filed: Mar. 21, 2008

(65) Prior Publication Data

US 2009/0235650 A1    Sep. 24, 2009

(51) Int. Cl.
    *F01N 3/00*    (2006.01)
    *F01N 3/10*    (2006.01)
    *B05B 1/24*    (2006.01)
    *B05B 15/00*    (2006.01)

(52) U.S. Cl. .............. 60/303; 60/295; 60/301; 239/132; 239/132.1; 239/132.3

(58) Field of Classification Search .................... 60/286, 60/295, 301, 303; 239/128, 132, 132.1, 132.3
See application file for complete search history.

(56) References Cited

U.S. PATENT DOCUMENTS

| 6,279,603 | B1 | 8/2001 | Czarnik et al. | |
|---|---|---|---|---|
| 6,513,323 | B1* | 2/2003 | Weigl et al. | 60/286 |
| 6,722,295 | B2 | 4/2004 | Zauderer | |
| 6,996,976 | B2* | 2/2006 | Rumminger et al. | 60/295 |
| 7,137,571 | B2 | 11/2006 | Caley et al. | |
| 2001/0036492 | A1 | 11/2001 | Wright et al. | |
| 2006/0101810 | A1 | 5/2006 | Angelo et al. | |
| 2006/0107655 | A1* | 5/2006 | Hanitzsch et al. | 60/286 |
| 2008/0209897 | A1* | 9/2008 | Urven et al. | 60/303 |
| 2010/0107614 | A1* | 5/2010 | Levin et al. | 60/303 |
| 2010/0320285 | A1* | 12/2010 | Haeberer et al. | 239/132 |

FOREIGN PATENT DOCUMENTS

JP    401135612    5/1989

* cited by examiner

*Primary Examiner* — Thomas Denion
*Assistant Examiner* — Audrey K Bradley
(74) *Attorney, Agent, or Firm* — Julia Voutyras; Alleman Hall McCoy Russell & Tuttle LLP

(57) ABSTRACT

A system for injecting from an injector into a duct of an engine system is provided. The system may include a first flange on a duct connection side, a second flange on an injector connection side, a stand-off separating the first flange from the second flange to form an air gap therebetween, and a seal offset from at least one of the first and the second flanges and located within the airgap and between the first flange and the second flange.

13 Claims, 6 Drawing Sheets

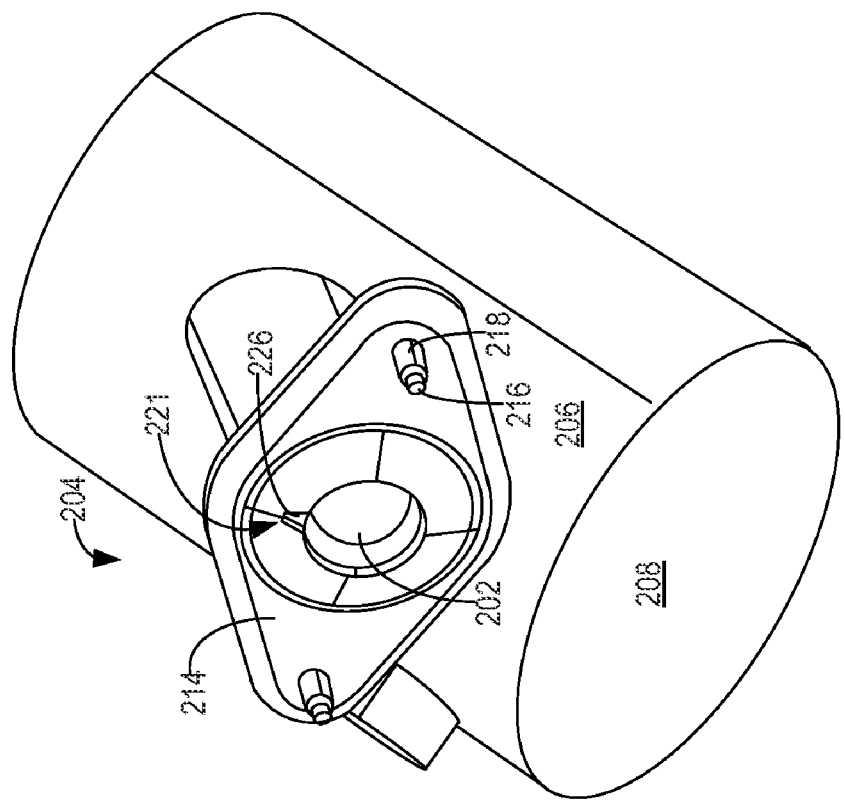
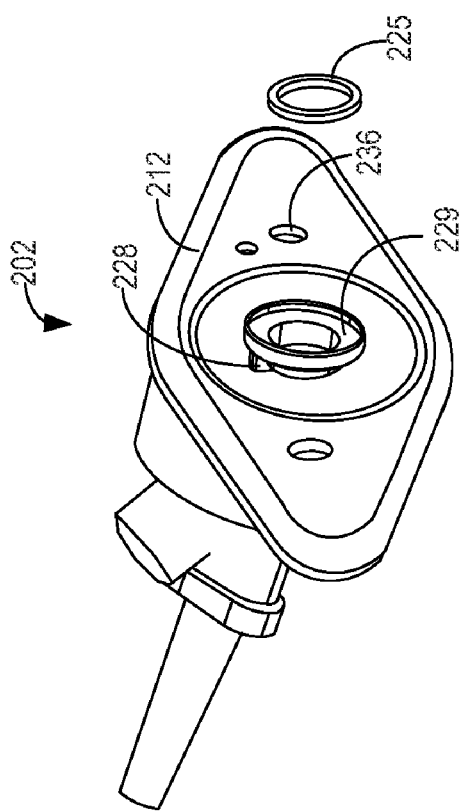
FIG. 3B
FIG. 3A

US 8,127,538 B2

LIQUID INJECTOR ASSEMBLY WITH A FLANGED CONNECTOR CONNECTION

BACKGROUND AND SUMMARY

Selective Catalyst Reduction (SCR) catalysts and liquid reductant (e.g., hydrocarbon or urea solution) injected into engine exhaust ducts may be used for reducing engine-out NOx emissions. However, heat from the engine exhaust may cause reductant injectors to overheat and may cause solids to deposit on the injector tip. The solid deposits may in turn result in clogging of the injector orifice.

One approach used to address injector overheating may be to use a small V-band clamp for connecting the injector and its mounting structure to the exhaust passage. The V-band serves to potentially insulate the injector from engine exhaust heat, thereby reducing solid deposit buildup.

However, the inventors herein have recognized that connecting the injector to the mounting structure using a V-band clamp may require special tools and may be too cumbersome to allow fast and easy assembly in a mass production environment. Likewise, premature degradation of the V-band clamp, due to assembly installation variation, for example, may increase exhaust leakage.

A system for injecting from an injector into a duct of an engine system is provided herein to at least partially address above mentioned issues. The system may include a first flange on a duct connection side, a second flange on an injector connection side, a stand-off separating the first flange from the second flange to form an air gap therebetween, and a seal offset from at least one of the first and the second flanges and located within the air gap and between the first flange and the second flange.

In this way, it is possible to obtain a reliable, robust, and time-efficient connection of the injector with reduced contact surface area between potentially high temperature injector components and the injector via the seal positioned in the air gap formed by the stand-off.

BRIEF DESCRIPTION OF THE DRAWINGS

FIG. 3A is a side perspective view of an injector module of a second embodiment of the injector assembly.

FIG. 3B is a side perspective view of an exhaust duct housing for the injector module of FIG. 3A.

DETAILED DESCRIPTION

Figure 1:
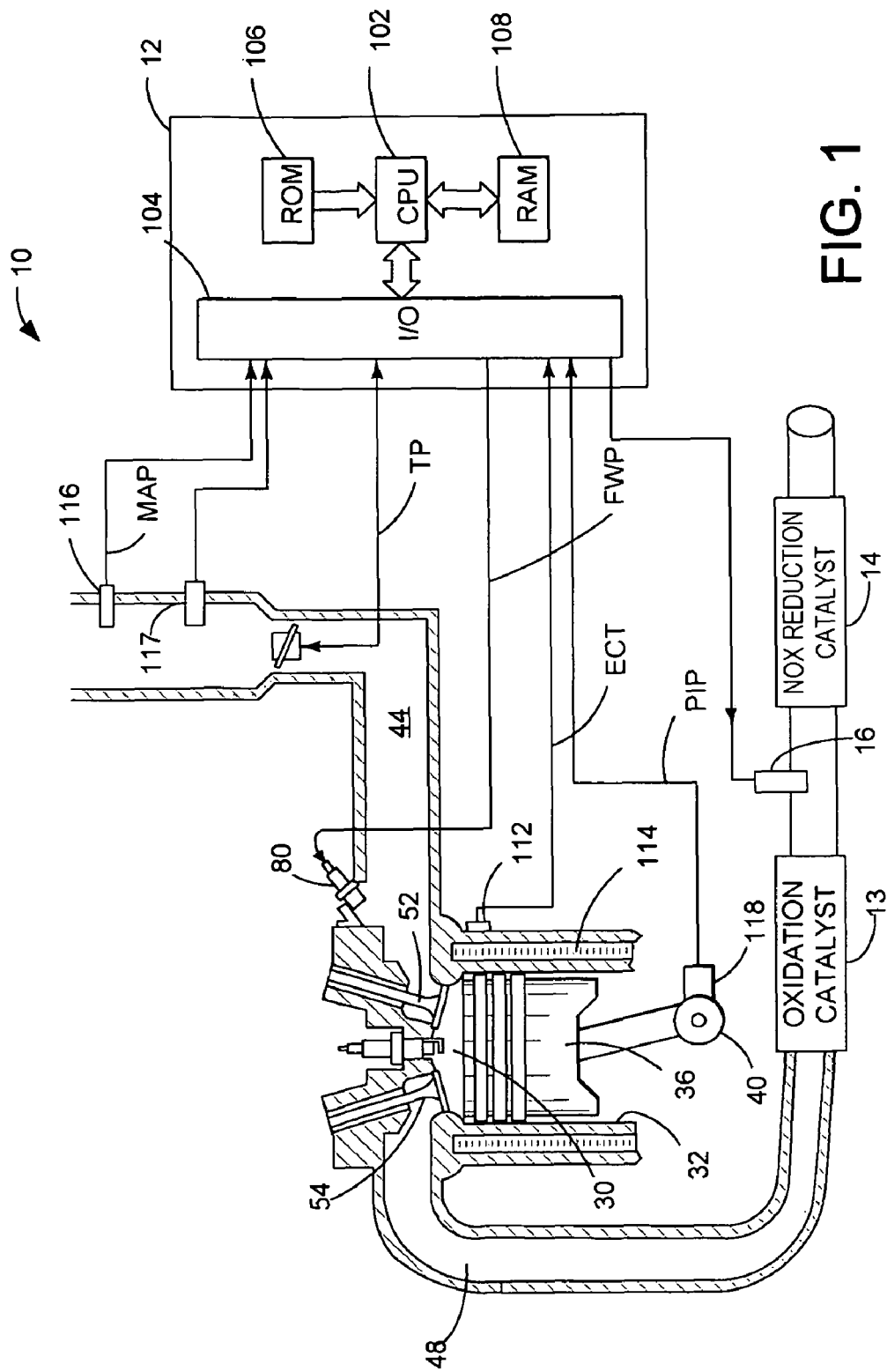
FIG. 1 is a schematic diagram of an example engine 10 in which an injector assembly for injecting liquid according to the present disclosure may be applied.

FIG. 1 is a schematic diagram of example environment in which an injector assembly for injecting liquid in a high temperature environment, such as injecting a liquid reductant into an engine exhaust for reducing NOx in a Selective Catalytic Reduction (SCR) catalyst, may be implemented. However, the various configurations described herein may be applied to other injection configurations, if desired, such as for injecting fuel into an intake duct, for example.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a fuel system including a fuel tank, fuel pump, and fuel rail (not shown).

Controller 12 is shown in FIG. 1 as a microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

Oxidation catalyst 13 is coupled to the exhaust manifold 48 downstream of engine 10 and may be a precious metal catalyst, such as platinum catalyst. A Selective Catalytic Reduction (SCR) Catalyst 14 for reducing NOx in an oxygen rich environment is coupled downstream of the oxidation catalyst 13.

A reductant delivery system 16 including an injector assembly (examples of which are illustrated in FIG. 2 to 4) is coupled to the exhaust gas manifold between the oxidation catalyst and the SCR catalyst 14 for supplying a reductant to the NOx reducing catalyst in Catalyst 14. The reductant may, for example, be fuel (hydrocarbon) or aqueous urea, etc.

It should be appreciated the above described example internal combustion engine 10 is non-limiting. Engine 10 may include a diesel engine that produces a mechanical output by combusting a mixture of air and diesel fuel. Alternatively, engine 10 may include other types of engines such as gasoline burning engines, among others. Further, engine 10 may be configured in a propulsion system for a vehicle. Alternatively, engine 10 may be operated in a stationary application, for example, as an electric generator. While exhaust system 10 may be applicable to stationary applications, it should be appreciated that exhaust system 10 as described herein, is particularly adapted for vehicle applications.

FIGS. 2 to 4 illustrate various non-limiting embodiments of an injector assembly 200 for injecting liquid from an injector into a high temperature air duct. The injector assembly 200 may be used in engine exhaust for delivering liquid reductant, such as urea or hydrocarbon, for reducing NOx in a SCR catalyst. The injector assembly 200 may also be used in other high temperature environments.

Figure 4B:
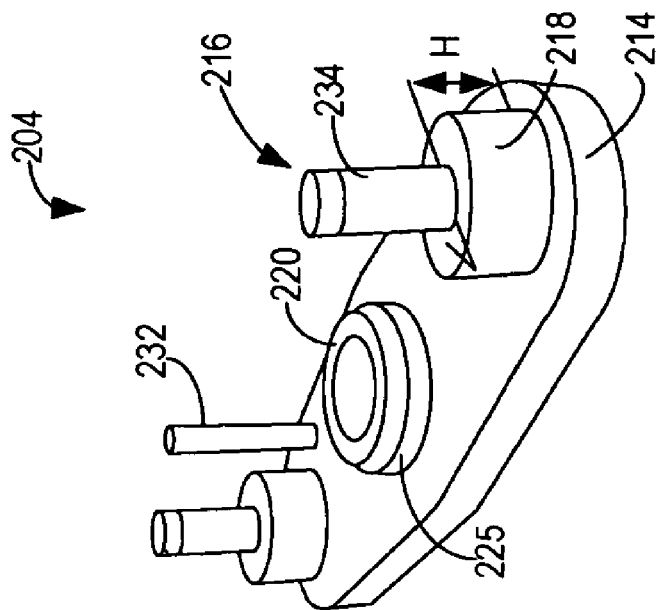
FIG. 4B is a side perspective view of an exhaust duct housing for the injector module of FIG. 4A.
Figure 4A:
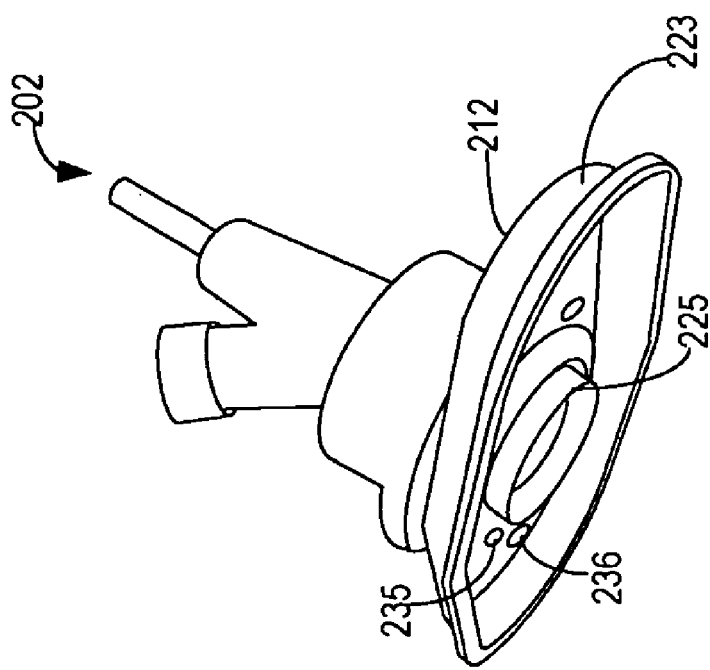
FIG. 4A is a side perspective view of an injector module of a third embodiment of the injector assembly

In particular, FIGS. 2A to 2D illustrate a first embodiment, FIGS. 3A and 3B illustrate a second embodiment, and FIGS. 4A to 4B illustrate a third embodiment of the injector assembly 200. For the sake of convenience, similar parts are labeled the same for all three embodiments. Also note that different elements of the different embodiments may be combined with one another.

The injector assembly 200 may include an injector module 202 on an injector connection side of the injector assembly 200, an exhaust duct housing 204 mounted on a wall 206 of an engine exhaust 208 on a duct connection side of the injector assembly 200, and a flanged connection portion 210 for coupling injector module 202 to exhaust duct housing 204.

The flanged connection portion 210 may include an injector module flange 212 coupled to the injector module 202, and an exhaust duct housing flange 214 coupled to the exhaust duct housing 204. The flanged connection portion 210 may additionally include a stand-off 218 separating the injector module flange 212 from the exhaust duct housing flange 214 to form an air gap 219 therebetween. The flanged connection portion 210 may further include a seal 225 that is offset from one, or both, of the injector module flange 212 and the exhaust duct housing flange 214.

The injector module flange 212 and the exhaust duct housing flange 214 may be of various shapes and designs. For example, the injector module flange 212 and the exhaust duct housing flange 214 may be substantially flat, as shown in FIGS. 1 and 2. Alternatively, either the injector module flange 212 or the exhaust duct housing flange 214 may curve toward exhaust at the edge to form a cover 223 for shielding the connection junction formed between the injector module flange 212 and the exhaust duct housing flange 214 when the injector module flange 212 is mounted on the exhaust duct housing flange 214. The cover 223 may form a tight fit or reserve an air gap for fluid communication between the junction between the injector module flange 212 and an outside environment. FIGS. 4A to 4B show that the injector module flange 212 curves toward exhaust at the edge to form a cover 223 that fits over the exhaust duct housing flange 214.

The seal 225 may be located within the air gap and between the injector module flange 212 and the exhaust duct housing flange 214. The seal 225 may also form an integral part of either or both of the injector module flange 212 and the exhaust duct housing flange 214. For example, the seal 225 may be installed/retained to the injector module flange 212 and/or the exhaust duct housing flange 214. The seal 225 may include a reduced sealing surface 220 and a recess 229, thus reducing heat transfer between the exhaust duct housing 204 to the injector module 202. In this way, over heating of the injector module 202 may be reduced.

Figure 2A:
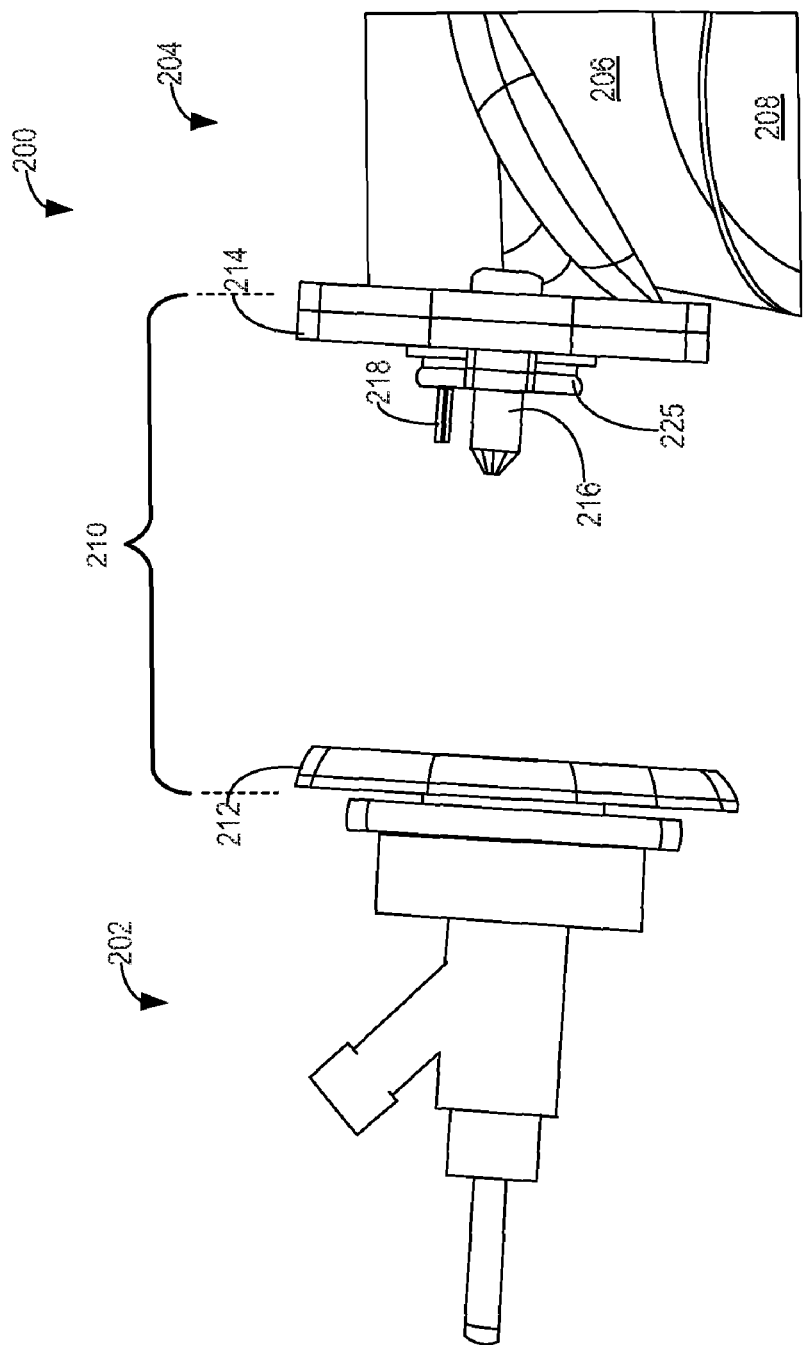
FIG. 2A is a side view of a first embodiment of an injector assembly, with an injector module of the injector assembly detached from an exhaust duct housing of the injector assembly.
Figure 2B:
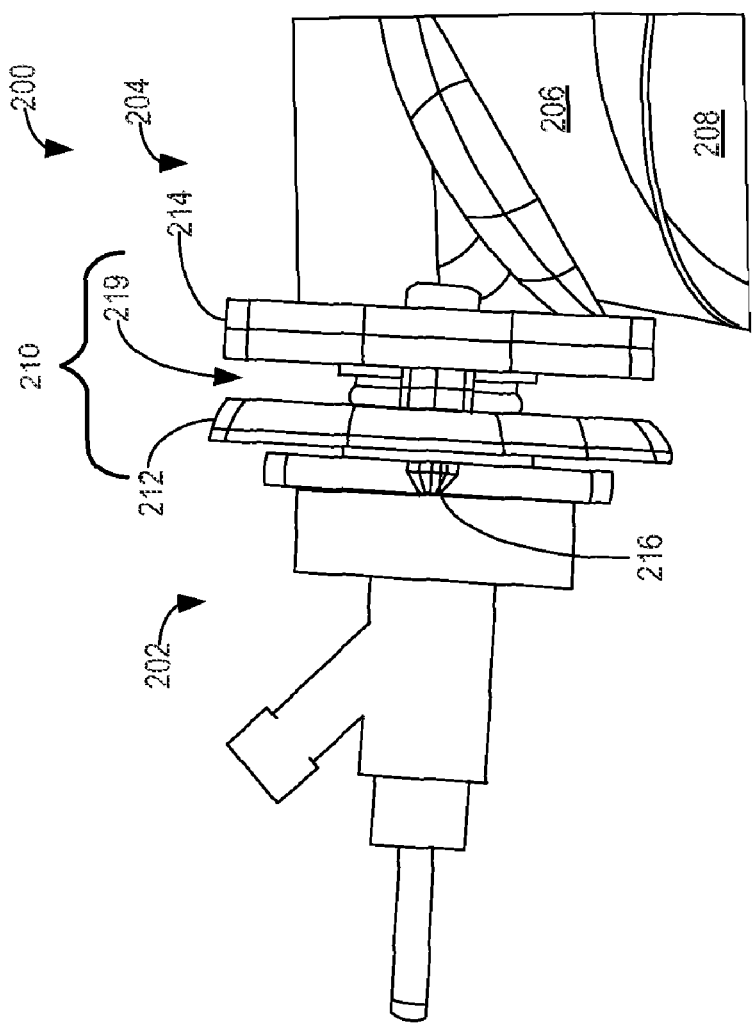
FIG. 2B is a side view of the injector assembly of FIG. 2A, with the injector module attached to the exhaust duct housing.
Figure 2D:
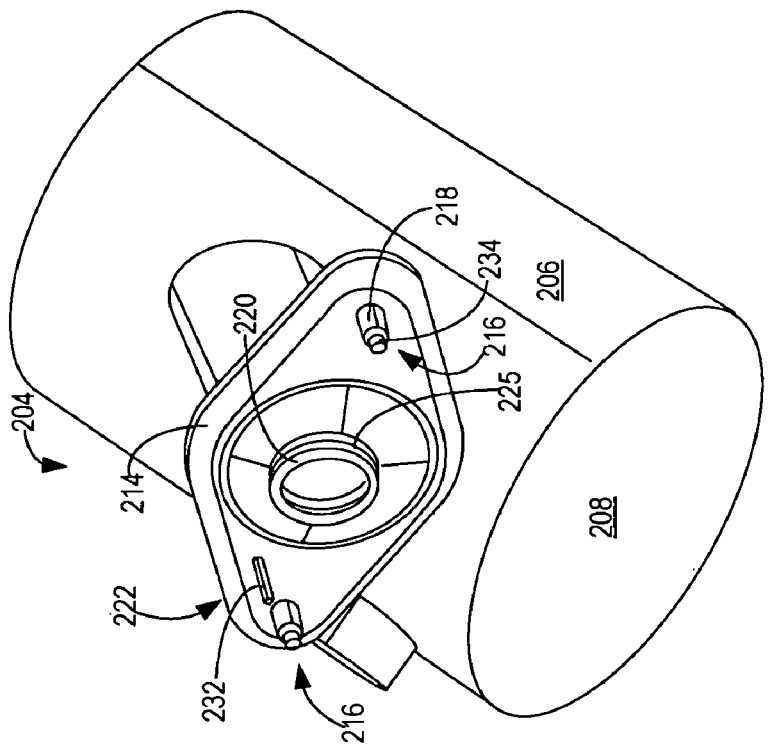
FIG. 2D is a side perspective view of the exhaust duct housing of the injector assembly of FIGS. 2A & 2B, showing details of an exhaust duct housing flange of the injector module.

The stand-off 218 may be various suitable parts that help to set apart the injector module flange 202 and the exhaust duct housing module 204 to create the air gap 219. For example, the stand-off 218 is shown in FIG. 2D to form a circular sleeve around at least one bolt 234 of the fastening structure 216. It is also possible for the exhaust duct housing 204 to include the standoff 218. The stand-off 218 may form an integral part of the injector module flange 212, the exhaust duct housing flange 214, and/or one or more of bolts 234 that form a fastening structure 216 for fastening the injector module flange 212 and the exhaust duct housing flange 214. The standoff 218 may include various suitable dimensions. In one example shown in FIG. 4B, the stand-off 218 may have a height of 10 mm, creating an air gap 219 having a height (H) of 10 mm. However, various other dimensions may be used; for example, the height of the stand-off may be between 5 and 15 mm, resulting in a corresponding range of air gaps.

The air gap 219 created may serve to reduce heat transfer from the exhaust duct housing 204 to the injector module 202 because of its relatively low thermal conductivity. The air gap 219 may be in a fluid communication with a cooler surrounding air, allowing the cooler surrounding air to circulate within the air gap 219 to cool the connection portion 210 to reduce heat transfer from the exhaust duct housing 204 to the injector module 202.

The flanged connection portion 210 may also include a fastening structure 216 configured to fasten the injector module flange 212 and the exhaust duct housing flange 214. In some examples, the fastening structure 216 may fasten the injector module flange 212 to the exhaust duct housing flange 214 in cooperation with the stand-off 218. The fastening structure 216 may be various suitable fastening structures 216 for fastening the injector module 202 to the exhaust duct housing 204. For example, the fastening structure 216 may include one or more bolt-nut fastening structures, such as two flange bolt-nut pairs. The fastening structure 216 may also include one or more holes for receiving the bolt-nut pairs. In one example and as illustrated in FIG. 2A to 2D, the fastening structure 216 may include a pair of bolts 235 coupled to the exhaust duct housing flange 214, a pair of bolt orifices 236 formed in the injector module flange 212 for receiving the pair of bolts 234, and a pair of nuts 238 configured to be fastened onto the pair of bolts 234.

The injector assembly 200 may further include an alignment feature 221 for aligning the injector module 202 and the exhaust duct housing 204 to ensure a consistent rotational positioning of the injector module 202 onto the exhaust duct housing 204, and/or a poka-yoke feature 222 to ensure reliable assembly of the injector module 202 and the exhaust duct housing 204. The alignment feature 221 and the poka-yoke feature 222 may be served by a single feature or may be served by separate features of the injector assembly 200. The alignment structure 221 may include various suitable structures or features that align the injector module 202 and the exhaust duct housing 204, for example by aligning the injector module flange 212 to the exhaust duct housing flange 214. The alignment feature 221 may include an alignment tab/notch structure. As shown in FIGS. 3A & 3B, the alignment tab/notch structure may include an alignment tab 228 formed on the injector module flange 212 and an alignment notch 226 formed on the exhaust duct housing flange 214, with the alignment notch 226 sized to receive the alignment tab 228.

Figure 2C:
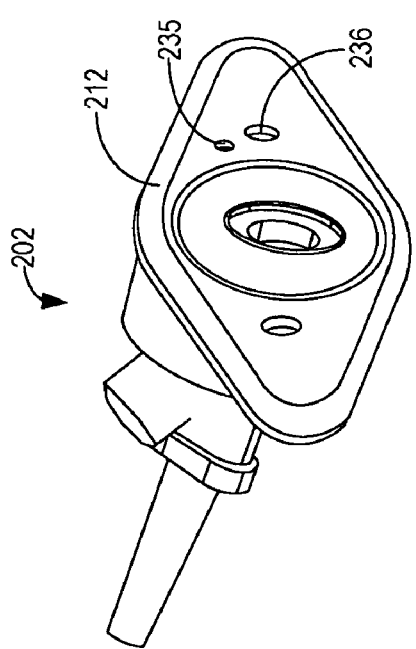
FIG. 2C is a side perspective view of the injector module of the injector assembly of FIGS. 2A & 2B, showing details of an injector module flange of the injector module.

The poka-yoke feature 222 may include various suitable structures of features that help to provide reliable assembly of the injector module 202 and the exhaust duct housing 204. For example, the poka-yoke feature 222 may include an asymmetrically positioned pin-hole structure. The pin-hole structure may include a pin 232 positioned on and may be an integral part of the exhaust duct housing flange 214, and an similarly off-centered and non-symmetrically positioned hole 234 formed in the injector module flange 212 for receiving the pin, as shown in FIGS. 2C, 2D as well as in FIGS. 4A and 4B. For another example, the poka-yoke feature 222 may include certain design dimensions, such as asymmetrically shaped and matching injector module flange 212 and exhaust duct housing flange 214, to assure the injector module 202 and the exhaust duct housing 204 are assembled the correct way.

It should be appreciated that the injector assembly 200 may include other structures or features that are not described above, such as a finned body, clamp, one or more connectors, graphite bush, and one or more lock washers, for example.

In this way, it is possible to achieve a relatively simple and reliable installation procedure. The installation procedure may include, for example, pushing the injector module 202 over bolts or studs positioned on injector module flange 204, and torquing nuts onto the bolts. This installation procedure may allow for a single-hand mounting of the injector module 202 onto the exhaust duct housing 204 and a hand-free fastening of the fastening structure 216.

It will also be appreciated that the configurations disclosed herein are exemplary in nature, and that these specific embodiments are not to be considered in a limiting sense, because numerous variations are possible. For example, while the above example approaches may be used to avoid a connection using a V-band clamp, in some elements of the above approaches may be combined with a V-band clamp to provide certain desired operation. Thus, the subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for injecting liquid from an injector into a duct of an engine system, comprising:
   a first flange on an injector connection side;
   a second flange on a duct connection side, where the duct is an exhaust passage;
   a pair of stand-offs separating the first flange from the second flange to form an air gap therebetween;
   a seal offset from both the first and second flanges and located within the air gap and between the first flange and the second flange;
   an SCR catalyst coupled downstream of the injector;
   a fastening structure configured to fasten the first flange and second flange in cooperation with the stand-offs, wherein the fastening structure includes bolts positioned within and through the stand-offs.

2. The system of claim 1, further comprising a poka-yoke feature configured to ensure fool proof assembly of the system.

3. The system of claim 1, wherein the stand-offs form integral parts of either the first flange and/or the second flange.

4. The system of claim 1, wherein the air gap formed measures approximately 10 mm from the first flange to the second flange.

5. The system of claim 1, wherein the air gap formed between the first flange and the second flange is in fluid communication with surrounding atmosphere.

6. The system of claim 1, wherein either the first flange or the second flange curves to form a cover that fits over the opposing flange.

7. The system of claim 1 further comprising an alignment structure configured to align the first flange to the second flange.

8. The system of claim 7, wherein the alignment structure includes an alignment tab/notch structure.

9. An injector module comprising:
   a first flange configured to be mounted to a second flange coupled to a duct of an engine system via a flanged connection portion, the flanged connection portion comprising:
   the first flange on an injector connection side;
   the second flange on a duct connection side;
   a pair of stand-offs separating the first flange from the second flange to form an air gap therebetween;
   a seal offset from at least one of the first and second flanges and located within the air gap and between the first flange and the second flange;
   a fastening structure including bolts, wherein the first flange is configured to be fastened to the second flange via the fastening structure;
   wherein the bolts are positioned within and through the stand-offs.

10. The injector module of claim 9, further comprising at least a portion of an alignment structure of the flanged connection portion that is configured to align the first flange to the second flange.

11. The injector module of claim 10, wherein the alignment structure includes a tab and notch structure.

12. The injector module of claim 10, wherein the alignment structure includes an asymmetrically positioned pin-hole structure.

13. An injector assembly for injecting liquid into a high temperature air duct, comprising:
   a flanged connection portion for mounting an injector module to an exhaust duct housing mounted on a high temperature air duct, the flanged connection portion comprising:
   an injector module flange coupled to the injector module;
   an exhaust duct housing flange coupled to the exhaust duct housing;
   a fastening structure including a pair of bolt-and-nut pairs configured to fasten the injector module to the exhaust duct housing, where bolts of the bolt-and-nut pairs form an integral part of the exhaust duct housing flange and where the injector module flange includes a pair of holes for accommodating the bolts;
   a first and second stand-off forming circular sleeves around each bolt of the pair of bolt-and-nut pairs, wherein the circular sleeves form integral parts of the exhaust duct housing flange;
   a raised sealing surface formed by one or more sealing rings, wherein the raised sealing surface is offset from the injector module flange and/or the exhaust duct housing flange; and
   a poka-yoke feature for preventing misalignment of the injector module and the exhaust duct housing during assembly;
   wherein the stand-off and/or the raised sealing surface are configured to create an air gap between the injector module flange and the exhaust duct housing flange.

* * * * *